United States Patent
Zhang et al.

(10) Patent No.: US 9,414,276 B2
(45) Date of Patent: Aug. 9, 2016

(54) MOBILITY MANAGEMENT METHOD AND APPARATUS IN HIGH SPEED RAILWAY

(75) Inventors: Zhang Zhang, Beijing (CN); Shengfang Ye, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 80 days.

(21) Appl. No.: 14/362,323

(22) PCT Filed: Dec. 31, 2011

(86) PCT No.: PCT/CN2011/002246
§ 371 (c)(1),
(2), (4) Date: Jun. 2, 2014

(87) PCT Pub. No.: WO2013/097063
PCT Pub. Date: Jul. 4, 2013

(65) Prior Publication Data
US 2014/0335865 A1   Nov. 13, 2014

(51) Int. Cl.
*H04W 36/00* (2009.01)
*H04W 36/08* (2009.01)

(52) U.S. Cl.
CPC .......... *H04W 36/08* (2013.01); *H04W 36/0061* (2013.01)

(58) Field of Classification Search
CPC .. H04W 36/00; H04W 36/0061; H04W 36/08
USPC ........................................................ 455/436
See application file for complete search history.

(56) References Cited

U.S. PATENT DOCUMENTS

| | | | | |
|---|---|---|---|---|
| 2002/0168969 | A1* | 11/2002 | Koskinen | H04W 48/12 455/424 |
| 2003/0210671 | A1* | 11/2003 | Eglin | H04L 12/4641 370/338 |
| 2003/0235165 | A1* | 12/2003 | Wang | H04W 36/12 370/331 |
| 2004/0248519 | A1 | 12/2004 | Niemela | |
| 2005/0020203 | A1* | 1/2005 | Losh | H04B 1/7097 455/11.1 |
| 2005/0259619 | A1* | 11/2005 | Boettle | H04W 36/32 370/331 |
| 2011/0267969 | A1* | 11/2011 | Ceccherini | H04W 36/0083 370/252 |

FOREIGN PATENT DOCUMENTS

| | | |
|---|---|---|
| CN | 101588624 | 11/2009 |
| CN | 102098708 | 6/2011 |
| CN | 102271374 | 12/2011 |

OTHER PUBLICATIONS

International Preliminary Report on Patentability for International Application No. PCT/CN2011/002246, mailed Jul. 1, 2014, 6 pages.

(Continued)

*Primary Examiner* — William Nealon
(74) *Attorney, Agent, or Firm* — Nicholson De Vos Webster & Elliott LLP (57) ABSTRACT

The invention discloses a method of mobility management in high speed railway, comprising: identifying whether a User Equipment (UE) is a high speed railway UE; if the UE is identified as a high speed railway UE, obtaining a high speed railway neighbor cell list for the UE, wherein the high speed railway neighbor cell list only includes high speed railway cell; and triggering a fast and earlier cell reselection, or cell handover, or both. This improves the mobility handling for high speed railway UE, decreased dropping risk and better user experienced performance are also provided.

20 Claims, 2 Drawing Sheets

(56) References Cited

OTHER PUBLICATIONS

"3rd Generation Partnership Project; Technical Specification Group Radio Access Network; Radio Resource Control (RRC); Protocol Specification (Release 7)", 3GPP TS 25.331 V7.4.0 (Mar. 2007), Section 14.1.2.

International Search Report, Application No. PCT/CN2011/002246, Sep. 27, 2012, 2 pages.

"3rd Generation Partnership Project; Technical Specification Group Radio Access Network; Requirements for support of radio resource management (FDD) (Release 8)", 3GPP TS 25.133 V8.3.0 (May 2008), 243 pages.

"3rd Generation Partnership Project; Technical Specification Group Radio Access Network; User Equipment (UE) procedures in idle mode and procedures for cell reselection in connected mode (Release 8)", 3GPP TS 25.304 V8.3.0 (Sep. 2008), 45 pages.

Hui, Hu, "Discussion on High-speed Railway Coverage Planning Method of WCDMA System", May 20, 2014, 6 pages.

* cited by examiner

MOBILITY MANAGEMENT METHOD AND APPARATUS IN HIGH SPEED RAILWAY

CROSS-REFERENCE TO RELATED APPLICATIONS

This application is a National stage of International Application No. PCT/CN2011/002246, filed Dec. 31, 2011, which are hereby incorporated by reference.

TECHNICAL FIELD

The invention generally relates to communication technologies, particularly to a mobility management method and apparatus in high speed railway.

BACKGROUND

Nowadays the emerging broadband wireless access technologies face long-term challenges to properly address the air link channel limitations with the growing demand on services, fast mobility and wide coverage. One of the most demanding and challenging scenarios is the high mobility scenarios, especially scenarios that matches the (high speed) railway domain.

Up to now, high speed railways, which generally refer to segments or sections of lines with the highest operation speed higher than 250 km/h, have been deployed in many countries such as Germany, Italy, Span, France, Japan, China, etc. The high speed railway domain introduces quite specific and challenging requirements.

The target customers of high-speed railways are people taking business trips and pleasure trips. Business travelers need to communicate with their business partners from time to time, while pleasure travelers show keen interest in entertainment services provided in the rail car. Meeting these requirements is of importance for the business of both the wireless network operators and the high-speed railway operators.

High-speed trains have a wholly-enclosed structure, and metal reflective glass is used for some models, with penetration loss reaching 24 dB or higher. This poses challenges on e.g. network deployment and cell/antenna configuration etc.

While high-speed users pass through multiple cells in a very short time, a mobile phone often cannot complete handover/cell change/cell reselection before the old cell is out of synch, leading to call drops. The network deployment and handover/cell change/cell selection procedure must be optimized to overcome this problem.

Currently, there exist several solutions targeting the problems mentioned above:

Firstly, a private network is deployed to address this problem, as described in Hu Hui's "WCDMA network coverage planning method for high speed railway". Particularly, by adopting the private Radio Base Station (RBS)/cell and/or carrier dedicated for the high speed railway, the private network specific for high speed railway can be optimized and high speed railway customers can be served specially. This can also minimize the impact on the current public network serving thus simplifies the optimization procedure.

Secondly, network deployment optimization is employed which involves following several aspects: (1) Deploying RBS a proper distance to the railway (e.g. 500 m). A too short distance may increase penetration loss, while a too long distance may decrease cell coverage and increase dropping probability due to handover/cell change/cell reselection failure; (2) Inter-RAN and inter-LA (location area) handover/cell change/cell reselection needs more time and is thus more likely failed at high speed. Therefore it is preferable to configure the cells serving the high speed railway under the same RNC and LA (or as least as possible). Moreover, if there are multiple RNCs/LAs, the RNC and LA border should be configured in relatively low speed area, such as railway station; (3) Properly increasing the cell overlapping area so that handover/cell change/cell reselection is more likely successfully completed before the terminal moves deep into the new cell and the signal to the original cell becomes very bad.

Both approaches introduced as above may help to avoid, more or less, that the signal to the original cell becomes too bad before the completion of handover/cell change/cell reselection.

As there may be both high speed UEs and low speed UEs in the system, and the UEs speed may vary, there has been proposed to adapt the mobility parameters based on the UE speed, which implies the mobility parameters are actually on UE level. Thus, good speed estimation for the UE is the key for really benefiting from the adaptation. There are several speed estimation methods, for instance: by measuring the Doppler shift in the signal carrier frequency, either at UE or at RBS; by calculating the distance divided by the elapsed time when A-GPS is available; by estimating the frequency of cell-reselection/handover; and by estimating the variation of a measured signal.

However, though private network is deemed as an attractive solution for high speed railway, it is too costly especially considering that the wireless traffic load in a railway network is in general low. Moreover, inter-frequency handover has to be implemented between the private network and the public network which introduces additional complexity.

A proper network deployment is another important aspect for high speed railway. But this is insufficient for guarantee a successful mobility procedure at a high speed, such as a speed more than 250 km/h. For instance, a cell far from the high speed railway may occasionally provide good coverage in a small area over the high speed railway. A high speed railway UE would very likely be dropped if having this cell as the serving cell (this likely happens with a conventional fast and earlier mobility procedure). Moreover, cell coverage shrinks when traffic load increases (cell breath effect), which leads to reduced cell overlapped area, i.e. the benefit from increasing cell overlapping area reduces.

Speed based mobility parameters adaptation is also a usable solution for high speed scenario, but speed estimation is a tricky task, which is always not so inaccurate and consumes extra power and signaling (an issue especially for idle mode), while A-GPS is not always available.

Accordingly, the invention seeks to find an improved method or system to preferably mitigate, alleviate or eliminate one or more of the above mentioned disadvantages singly or in any combination.

SUMMARY

To this end, in one aspect of the invention, there is provided a method of mobility management in high speed railway, comprising: identifying whether a User Equipment (UE) is a high speed railway UE; if the UE is identified as a high speed railway UE, obtaining a high speed railway neighbor cell list for the UE, wherein the high speed railway neighbor cell list only includes high speed railway cell; and triggering a fast and earlier cell reselection, or cell handover, or both.

In an embodiment, the high speed railway cell is preferably a true high speed railway cell covering a high speed section of the high speed railway.

In an embodiment, identifying whether a User Equipment (UE) is a high speed railway UE is based on categories of cells that the UE is connected to or camped on in a certain period.

In an embodiment, the UE is identified as the high speed railway UE if at least one of the following conditions is met: past M cells the UE camped on or connected to are all high speed railway cells; and past N cells the UE camped on or connected to match a predetermined camping or connecting cell list; wherein M, N are configurable parameters.

The identifying is preferably repeated two or more rounds before making a decision.

In an embodiment, the high speed railway cell has a default neighbor cell list for an identified non-high speed railway UE or an unidentified UE, and two high speed railway neighbor cell lists are used for an identified high speed railway UE.

The method may be implemented by any one of a base station device, a base station control device, and a terminal device.

In another aspect of the invention, there is provided an apparatus for mobility management in high speed railway, comprising: an identifying module for identifying whether a User Equipment (UE) is a high speed railway UE; an obtaining module for obtaining, if the UE is identified as a high speed railway UE, a high speed railway neighbor cell list for the UE, wherein the high speed railway neighbor cell list only includes high speed railway cell; and a triggering module for triggering a fast and earlier cell reselection, or cell handover, or both.

In an embodiment, the high speed railway cell is preferably a true high speed railway cell covering a high speed section of the high speed railway.

In an embodiment, the identifying module is further configured to identify whether a User Equipment (UE) is a high speed railway UE based on categories of cells that the UE is connected to or camped on in a certain period.

In an embodiment, the identifying module is further configured to identify the UE as the high speed railway UE if at least one of the following conditions is met: past M cells the UE camps on or connects to are all high speed railway cells; and past N cells the UE camps on or connects to match a predetermined camping or connecting cell list; wherein M, N are configurable parameters.

In an embodiment, the identifying module is further configured to repeat the identification two or more rounds before making a decision.

In an embodiment, the high speed railway cell has a default neighbor cell list for an identified non-high speed railway UE or an unidentified UE, and two high speed railway neighbor cell lists are used for an identified high speed railway UE.

The apparatus may be any one of a base station device, a base station control device, and a terminal device.

In a third aspect of the invention, a computer program product comprising a set of computer executable instructions stored on a computer readable medium, configured to implement the method according to the method of the embodiments of the invention.

According to embodiments of the invention, identifying whether a UE is a high speed railway UE or not is efficient and reliable, and it is no need to detect UE speed which is inaccurate and power expensive. Further, adaptivity is provided based on identified UE mobility status and cell operation status, which improves the mobility handling for high speed railway UE; decreased dropping risk and better user experienced performance are also provided. No impact is brought on non-high speed railway UEs.

BRIEF DESCRIPTION OF THE DRAWINGS

The features and advantageous of the present invention will be more apparent from the following exemplary embodiments of the invention illustrated with reference to the accompanied drawings, in which.

DETAILED DESCRIPTION

Embodiments of the invention will be described thoroughly hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

In this disclosure, although terminologies from a certain radio access network system have been used to exemplify the invention, this should not be seen as limiting the scope of the invention to only the aforementioned system. Embodiments of the invention may be applied in various wireless networks as appropriately, such as WCDMA, GSM, 3GPP LTE etc. Given the rapid development in communications, there will of course also be future type wireless communications technologies and systems with which the present invention may be embodied. It should not be seen as limiting the scope of the invention to only the aforementioned system.

From the telecom point of view, normally the railway network is not a heavy loaded telecom network. Simultaneously, the mobile node's mobility pattern is quite predictable. These can make the railway domain to be used for providing a favorable scenario.

Figure 1:
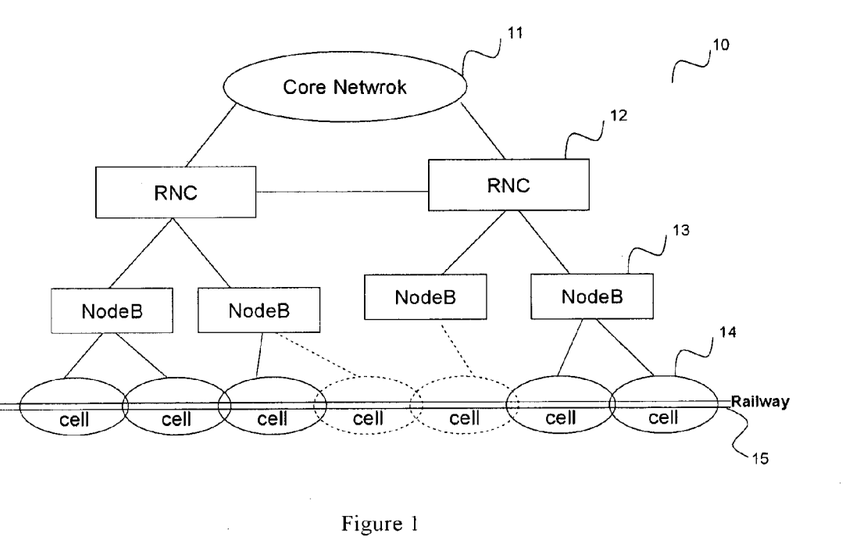
FIG. 1 illustrates a general structural diagram of an exemplary wireless system covering high speed railway.

As an example, FIG. 1 illustrates a general structural diagram of an exemplary wireless system 10 covering the high speed railway 15. Specifically, various cells 14 serving UEs are deployed with a certain overlay with each other along the high speed railway 15. A NodeB 13 located at a cell site may provide radio air interface to each cell and may manage several cells although one or two cells are illustrated in the Figure. A Radio Network Controller (RNC) 12 may provide control on multiple cell sites and radio transceivers, supporting cell handover/reselection and resource allocation. The RNCs may be connected through core network 11 such as packet Gateway located at MSC, etc.

Figure 2:
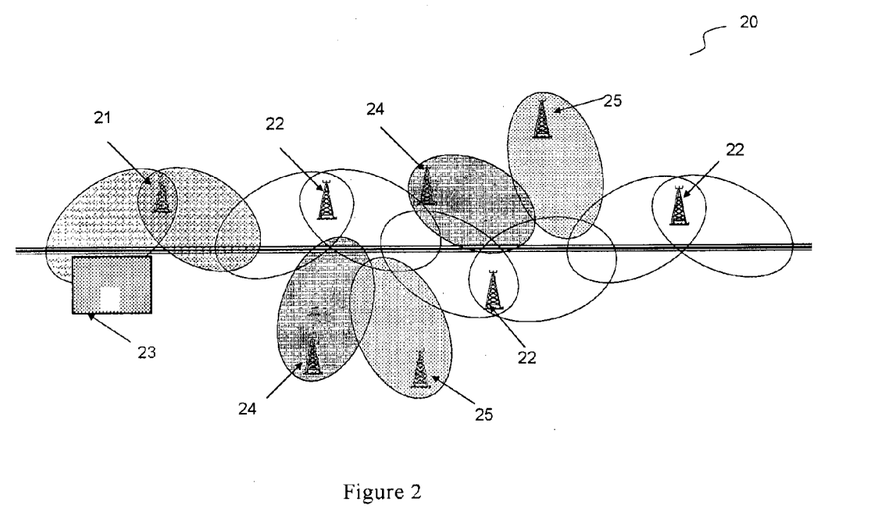
FIG. 2 illustrates a general sketch of cell deployment along high speed railway.

With reference to FIG. 2 which illustrates general sketch of cell deployment along high speed railway according to an embodiment, the categories of the cells of an embodiment according to the invention generally include at least the following four kinds of cells: a true high speed railway cell (e.g., related to base station 22); an artificial high speed railway cell (e.g., related to base station 21); both of which cover a relative large coverage over the high speed railway; a high speed railway cell with relative small/medium coverage over the high speed railway (e.g., related to base station 24); and a non-high speed railway cell (e.g., related to base station 25). There is general a coverage overlap between adjacent cells as in practical application. A railway station 23 is schematically illustrated as an example in connection with the artificial high speed railway cell 21.

The relative small/medium/large coverage may be distinguished and determined according to various manners in the prior art. As an example, a ratio of cell radius to a section length of the high speed railway that falls in the coverage area of the cell may be utilized as a criterion of determination.

The true high speed railway cells and the artificial high speed railway cells with relative large coverage over the high speed railway may be divided depending on the operation speed of each section of the high speed railway line served by the high speed railway cells. Particularly, the true high speed railway cells cover the high speed operation sections, and artificial high speed railway cells cover the low to medium speed operation sections (for instance, those high speed railway cells close to the stations).

Figure 3:
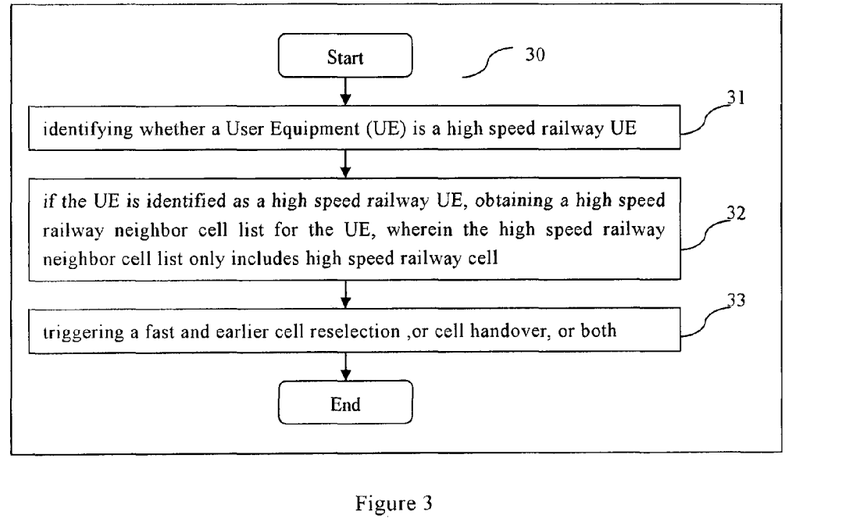
FIG. 3 illustrates a flowchart of a method for mobility management in high speed railway according to an embodiment of the invention.

In one embodiment, the method 30 of mobility management in high speed railway includes the following steps.

In step 31, firstly, it is identified whether a User Equipment (UE) is a high speed railway UE. The identification of UE will be described in detail hereinafter.

In step 32, if the UE is identified as a high speed railway UE, a high speed railway neighbor cell list for the UE will be obtained in Various manners; wherein the high speed railway neighbor cell list(s) only includes high speed railway cell.

Preferably, in the neighbor cell list(s) specific for the high speed railway UE in an embodiment, only the true high speed railway cell (e.g., related to base station 22) and artificial high speed railway cell (e.g., related to base station 21) as shown in FIG. 1 are included. In this way, a faster mobility procedure is provide for the high speed railway UE as less cells need to be monitored. In another embodiment, the high speed railway cell list may only include the true high speed railway cell.

Obtaining high speed railway neighbor cell list(s) will be described in detail after the introduction of identifying high speed railway UE.

In step 33, a fast and earlier cell reselection, or cell handover, or both will be triggered with the obtained high speed railway neighbor cell list(s) if the UE is identified as a high speed railway UE.

According to the embodiment of the invention, the high speed mobility management includes two aspects: a fast and earlier triggering of mobility procedure specific for high speed railway UE; and a special and simplified neighbor cell list(s) specific for the high speed railway UE. These aspects will be illustrated later.

Preferably, the high speed mobility management is activated for a UE if the UE is identified as a high speed railway UE, and the cell that the UE camps on/connects to is a true high speed railway cell covering a high speed operation section of the high speed railway line.

According to some embodiments of the method, the high speed railway UE may be avoided to connect to some (remote) cells which provide good coverage only in a small/medium area over high speed railway. This can minimize the dropping risk and maximize the benefit of fast and earlier triggering of mobility procedure designed for high speed UEs. Simultaneously, no impact is brought on non-high speed railway UEs or unidentified UEs.

Some embodiments of this invention enables the network or the UE to identify whether a UE is a high speed railway UE or not while sufficiently taking the mobility characteristics of high speed railway into account, and accordingly adapts the mobility management based on the identified UE mobility status (for example, a high speed railway UE, or a non-high speed railway UE/common UE) and preferably also the operation speed on the sections of the railway lines (e.g., a true high speed operation section, or an artificial high speed operation section such as sections close to the railway stations).

Figure 4:
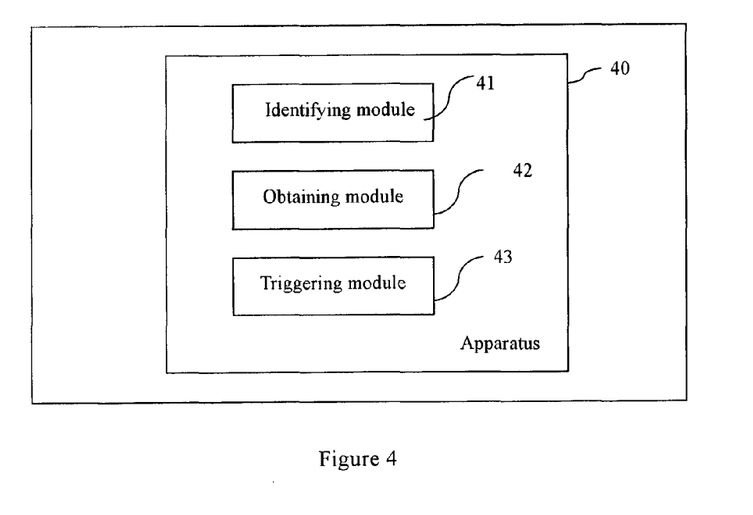
FIG. 4 illustrates a schematic diagram of an apparatus for mobility management in high speed railway according to an embodiment of the invention.

FIG. 4 illustrates a schematic diagram of an apparatus 40 for mobility management in high speed railway according to an embodiment of the invention. The apparatus 40 includes an identifying module 41 for identifying whether a User Equipment (UE) is a high speed railway UE; an obtaining module 42 for obtaining, if the UE is identified as a high speed railway UE, a high speed railway neighbor cell list for the UE, wherein the high speed railway neighbor cell list only includes high speed railway cell; and a triggering module 43 for triggering a fast and earlier cell reselection, or cell handover, or both. The identification of a high speed railway UE and high speed mobility management of UE, etc., will be described in detail hereinafter.

To be clarity and conciseness, it is to be appreciated that the features in one embodiment may adapt to another embodiment as appropriately without departing from the scope of the invention.

Identification of High Speed Railway UE

First it is to be noted that identifying a high speed railway UE in this disclosure is very different from the approach of estimating UE speed thus identifying a UE with high speed in prior art. Conventionally, a common UE may change speed over time, thus requiring frequently UE speed monitoring.

However, in the embodiments of the invention, a high speed railway scenario has its own characteristics:

High speed railway UE moves along pre-determined routes, mainly along straight lines, thus for a high speed railway UE, giving the current connected (camped) cell, which cells to be connected to (or camped on) can be well known in advance.

Operation time for each section of line is precisely scheduled, implying a known operation speed for each section of line.

The cells that provide major/large coverage over the high speed railway, denoted as high speed railway cells, can also be known in advance by network planning and field test. Each cell may be assigned with a special identifier to identify if it is a high speed railway cell or not.

The identification process of a high speed railway UE in the embodiment of the invention sufficiently takes these characteristics into account.

In the embodiment, the identification process only needs to be initialized or restarted for a UE when both of the following conditions are satisfied:

It has not been identified whether the UE is a high speed railway UE or not. For a UE newly powers on, the UE's mobility status (high speed railway UE or non-high speed railway UE) is always set as unidentified; and the UE is currently connecting to or camping on a high speed railway cell (which can be known from e.g. the high speed railway cell identifier).

In idle mode (e.g., when no call/service is initiated), the identification is initialized by UE; while in connected mode (e.g., when a call/service is initiated), the identification process may be initialized from network side (e.g., by NodeB or RNC) or by UE itself.

When the UE mobility status is identified, that is, the UE is identified as a common UE (or a non-high speed railway UE), or a high speed railway UE, the identification is no more needed until one of following situations occurs.

Particularly, for an identified high speed railway UE, if the UE camps on/connects to a non-high speed railway cell (although this should happen rarely with a properly selected set of high speed railway cells) and then camps on/connects to a high speed railway cell again since the mobility status is reset to unidentified when an identified high speed railway UE camps on/connects to a non-high speed railway cell, or if the UE enters into a connected mode and ordered by the network side, the identification process may also be initiated again.

For an identified non-high speed railway UE, if, for example, the UE enters the entrance high speed railway cell which serves the railway station area, the identification process may be initiated again.

For today's non-high speed railway cells, no special action is needed, i.e. no new signaling is needed and the UEs that camp on those cells just perform cell reselection as today, the UE mobility status is unidentified if the UE all along camps on/connects to non-high speed railway cells.

In the embodiment, an identification criteria as below may be taken to determine if a UE can be identified as a high speed railway UE.

In particular, if the past M cells the UE camped on/connected to are all high speed railway cells, and/or the past N cells the UE camped on/connected to match one of the system predictions, the UE may be identified as a high speed railway UE. As an example, the system predictions may include two predicted camping/connecting cell lists, each corresponds to the cells in one moving direction of the high speed train. Based on this, the UE may also know its moving direction.

Preferably, the Identification process may be repeated a plurality of rounds (e.g., K rounds) before making the decision, so as to make the result more precisely.

Accordingly, a UE may be identified as a non-high speed railway UE if the past P out of M cells the UE camped on/connected to are not high speed railway cells, and/or the past N cells the UE camped on/connected to do not match any of the system prediction.

Also, the identification process may be repeated multiple rounds (e.g., Q rounds) before making the decision, so as to make the result more precisely.

Parameters, such as M, N, P, Q and K as mentioned above are system configurable parameters and may also be sent to the UE via broadcast message.

There is a certain probability that the mobility status of the UE remains unidentified while the UE moves to a non-high speed railway cell. In that case the identification procedure may be simply terminated.

As described above, the high speed railway UE may be identified by checking the categories of the cells that the UE connected to (or camped on) in a certain period. There are other ways to identify a high speed railway UE. For example, mobile business and/or the Internet technologies may be used to determine if a UE is a high speed railway UE or not. For example, when a UE confirms it enters to a certain area (e.g. a high speed train) via the stored identity or permission info, or the UE is used to pay (e.g. buy things) in a certain area (e.g. high speed train), the presence of the UE in that area (e.g. high speed train) may be sent to the wireless network via the Internet technologies.

Hereinafter, further, identification process in idle mode and connected mode will be illustrated respectively.

In idle mode, the identification process is only performed by UE (except with the Internet of things technology) as the network does not know the existence of UE. A high speed railway cell may tell the served UE via broadcast message which of its neighbor cells are high speed railway cells and which are not (by e.g. using the high speed railway cell identifier). It can further tell the served UE the high speed railway cells it would camp on if the UE is a high speed railway UE. This may include two sets of predicted camping cells, each for one moving direction. Special tags can be added upon these sets to indicate which moving direction they represent. Then the UE may perform the identification according to the criteria described above.

In connected mode, the identification of high speed railway UE may be performed by either network or UE: In case by network, when an unidentified UE connects to a high speed railway cell and the identification is not started yet, the network can initialize the identification and collects the cells status that the UE connects to in a certain following period and then perform the identification according to the criteria described above. This may involve RNC or other network side device (e.g., NodeB) where the identification is performed. For identification performed by UE, the procedure is similar to that in idle mode, while instead of monitoring the cells that it camps on, the UE monitors the cells that it connects to.

If a UE has already identified its mobility status, it may report and register its status to the network when it enters into the connected mode. The registration is to be reset if the UE leaves the network or powers-off.

High Speed Mobility management

The high speed mobility management according to the embodiments of the present invention is embodied in two aspects: a fast and earlier triggering of mobility procedure specific for high speed railway UE; and obtaining neighbor cell list(s) specific for high speed railway UE.

Particularly, the first aspect for the high speed mobility management includes two cases: cell reselection and cell handover/cell change, which will be generally introduced hereinafter for integrality and clarity of the disclosure although some contents are well known in the prior art.

For the cell reselection, it is well known the cell reselection procedure allows the UE in idle mode to select a more suitable cell and camp on it. The UE attempts to detect, synchronize, and monitor cells indicated in the measurement control system information of its serving cell. UE measurement activity is also controlled by certain measurement rules, allowing the UE to limit its measurement activity if certain conditions are fulfilled. More specifically, for example, for FDD cells, UE in idle mode may choose to not perform intra-frequency measurements if Squal>Sintrasearch; if Squal<=Sintrasearch or Sintrasearch is not sent for serving cell, intra-frequency measurements will be performed. Parameter Squal is calculated based on measured parameter CPICH Ec/Io or CPICH RSCP.

The cell reselection criterion adopts criterion R, i.e. a cell in the neighbor cell list of the current serving cell is ranked having better quality than the serving cell when (Qmeas,n−Qoffsets,n)>(Qmeas,s+Qhysts) is fulfilled for Treselection time. Where Qmeas,n represents CPICH quality (either Ec/Io or RSCP) measurement of the neighbor cell; Qmeas,s represents CPICH quality (either Ec/Io or RSCP) measurement of the serving cell; Qoffsets,n represents CPICH quality offset between the serving and the neighbor cell; and Qhysts represents hysteresis to Qmeas,s.

In this case the UE performs cell reselection to the new cell. All parameters are on cell level.

For the Handover/cell change, it is well known that the handover/cell change procedure allows the UE in connected mode to connect to a more suitable cell so that service continuity may be ensured when the UE is moving. Intra-frequency handover/cell change is based on the following events, more specially:

A new cell in the neighbor cell list is added into the active set (AS) when $10 \cdot \text{Log } M_{New} + CIO_{New} \geq 10 \cdot \text{Log } M_{Best} - (R_{1a} - H_{1a}/2)$, is fulfilled for a time period indicated by "time to trigger" and the AS is not full yet (event 1A)

A new cell in the neighbor cell replaces a cell in the AS when $10 \cdot \text{Log } M_{New} + \text{CIO}_{New} \geq 10 \cdot \text{Log } M_{InAS} + \text{CIO}_{InAS} + H_{1c}/2$, is fulfilled for a time period indicated by "time to trigger" and the AS is full (event 1C)

Change the serving cell with another cell in the active set when $10 \cdot \text{Log } M_{NotBest} + \text{CIO}_{NotBest} \geq 10 \cdot \text{Log } M_{Best} + \text{CIO}_{Best} + H_{1d}/2$, is fulfilled for a time period indicated by "time to trigger" (event 1D)

Where Mx is the measurement quantity, in terms of either CPICH Ec/Io or CPICH RSCP; CIOx is the cell individual offset; R1a is the reporting range constant; Hx is the hysteresis parameter. The time to trigger may be different for different events. All parameters are on cell level.

To trigger a fast and earlier high speed mobility procedure, handover/cell change/cell reselection parameters, e.g., listed below, may be tuned: (1) Earlier triggering of Handover/cell change via tuning parameters such as cell individual offset and hysteresis or earlier triggering of cell reselection via tuning parameters such as Qoffsets,n and Qhysts; and (2) Shortening the handover/cell change/cell reselection time via tuning the time to trigger for Handover/cell change or Treselection for cell reselection.

For the second aspect of the high speed mobility management according to the embodiments of the invention, a neighbor cell list(s) for a high speed railway UE will be obtained.

Particularly, currently neighbor cell list is per cell defined. As pointed out above, a cell far from the high speed railway may occasionally provide good coverage in a small/medium area over the high speed railway. A high speed railway UE would very likely be dropped if it camps on/connects to this cell. This more likely happens with a fast and earlier mobility procedure which is designed specific for high speed scenario conventionally.

According to an embodiment of the invention, a solution to address this issue is to limit the high speed railway UE to access this kind of cells. For a normal non-high speed UE, however this limitation is not adopted easily since the UE may move in any direction. However, in the context of the disclosure, this may be implemented by e.g. (but not limited to) having a different neighbor cell list for a respective high speed railway UE and non-high speed railway or unidentified UE.

In an embodiment of the invention, as mentioned above, the high speed mobility management is activated for an identified high speed railway UE if the cell the UE camps on/connects to is a true high speed railway cell, i.e., a high speed railway cell with a large coverage area along the high speed railway line and covering a high speed operation section of the railway line.

More specifically, two sets of neighbor cell lists may be defined for each true high speed railway cell which may serve non-high speed railway UE, unidentified UE or identified high speed railway UE. One is for non-high speed railway UE and/or unidentified UE, which is simply the default neighbor cell lists, denoted default neighbor cell lists, which may include both high speed railway cells and non-high speed railway cells. The other neighbor cell list is specific for high-speed railway UE, denoted high speed railway neighbor cell list, which includes only high speed railway cells and thus is a subset of the default neighbor cell list.

For UE mobility status identification purpose as mentioned above, two high speed railway cell lists are introduced, each representing one moving direction and used for predicting the cells that a high speed railway UE would camp on/connect to. The high speed railway neighbor cell list may include cells from both of these two lists, but when in use, cells from one of the lists are actually monitored depending on the identified UE moving direction. Another alternative is to explicitly define two high speed railway neighbor cell lists, each for one moving direction.

It is to be noted that not all the high speed railway cells in the default neighbor cell list has to be in the high speed railway, neighbor cell list. If e.g., those cells only provide small/medium coverage over the high speed railway and in its served area the signal from other high speed railway cells that provide larger coverage over the high speed railway do not all become very bad, they will not be included in the high speed railway neighbor cell list of the invention. The reason to include this kind of cells as high speed railway cell is to ensure the reliability of UE mobility status identification. This works as normal mobility procedure adopted based on the default neighbor cell list when the mobility status is not yet identified for the UE, i.e. the default neighbor cell list is used no matter how high speed railway cell is defined. Once the UE is identified as a high speed railway UE, the high speed railway neighbor cell list(s) is used for that UE if it is served by a true high speed railway cell.

The high speed railway neighbor cell list may be implemented either explicitly or implicitly as below.

In the explicit alternative, each true high speed railway cell inform its default and high speed railway neighbor cell lists to the UEs via broadcast message. This may be implemented by adding an indicator to cells in the default neighbor cell list to indicate if they are also in the high speed railway neighbor cell list(s). The identified high speed railway UEs then only monitor and report the quality of the cells in the corresponding high speed railway neighbor cell list.

In the implicit alternative, still only the default neighbor cell list is informed to the UEs via broadcast message. The UEs monitor and report the quality of all the cells in the default neighbor cell list, however, each true high speed railway cell only takes the measurement report of cells in the high speed railway neighbor cell list(s) into account for the high speed railway UEs it serves.

The implicit alternative works if the network knows the UE's mobility status. This is however tricky to realize in idle mode if without the internet of the things technology.

With the elaborately designed neighbor cell list for high speed railway UE, following advantageous may be achieved. A faster mobility procedure is provided for the high speed railway UE as less cells need to be monitored (especially for in the explicit alternative); the high speed railway UE may be avoided to connect to (remote) cells that only provide good coverage in small/medium area over high speed railway. This minimizes the dropping risk and maximizes the benefit of fast and earlier triggering of mobility procedure designed for high speed UEs. Further, no impact is brought on non-high speed railway UEs or unidentified UEs.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

It is to be noted that, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Further, it is to be noted that, the order of features/steps in the claims or in the description do not imply any specific order in which the features/steps must be worked. Rather, the steps/features may be performed in any suitable order.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and/or functionally distributed between different units and processors.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "including", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A method of mobility management in a high speed railway, comprising:
   identifying whether a User Equipment (UE) is a high speed railway UE that camps on or connects to a high speed railway cell serving the high speed railway;
   if the UE is identified as a high speed railway UE, obtaining a high speed railway neighbor cell list for the UE, wherein the high speed railway neighbor cell list only includes one or more high speed railway cells serving the high speed railway, and wherein each of the one or more high speed railway cells in the high speed railway neighbor cell list is represented by an identifier identifying the cell; and
   triggering at least one of cell reselection and cell handover based on the high speed railway neighbor cell list.

2. The method of claim 1, wherein the high speed railway cell is a true high speed railway cell covering a high speed section of the high speed railway, wherein the high speed railway in the high speed section operates at a speed higher than 250 kilometer per hour.

3. The method of claim 1, wherein identifying whether the UE is a high speed railway UE is based on categories of cells that the UE is connected to or camped on in a certain period, and wherein the categories include high speed railway cells and non-high speed railway cells.

4. The method of claim 3, wherein the UE is identified as a high speed railway UE if at least one of the following conditions is met:
   past M cells the UE camps on or connects to are all high speed railway cells; and
   past N cells the UE camps on or connects to match a predetermined camping or connecting cell list, wherein M, N are configurable parameters.

5. The method of claim 4, wherein the identifying is repeated two or more rounds before making the decision.

6. The method of claim 1, wherein the high speed railway cell has a default neighbor cell list for an UE identified to be a non-high speed railway UE or an UE that is unidentified as of whether or not the UE being a high speed railway UE, and two high speed railway neighbor cell lists for an UE identified to be a high speed railway UE, wherein the default neighbor cell list includes both high speed railway cells and non-high speed railway cells.

7. The method of claim 1, wherein the method may be implemented by any one of a base station device, a base station control device, and a terminal device.

8. An apparatus for mobility management in a high speed railway, comprising:
   an identifying module for identifying whether a User Equipment (UE) is a high speed railway UE that camps on or connects to a high speed railway cell serving the high speed railway;
   an obtaining module for obtaining, if the UE is identified as a high speed railway UE, a high speed railway neighbor cell list for the UE, wherein the high speed railway neighbor cell list only includes one or more high speed railway cells serving the high speed railway, and wherein each of the one or more high speed railway cells in the high speed railway neighbor cell list is represented by an identifier identifying the cell; and
   a triggering module for triggering at least one of cell reselection and cell handover based on the high speed railway neighbor cell list.

9. The apparatus of claim 8, wherein the high speed railway cell is a true high speed railway cell covering a high speed section of the high speed railway, wherein the high speed railway in the high speed section operates at a speed higher than 250 kilometer per hour.

10. The apparatus of claim 8, wherein the identifying module is configured to identify whether the UE is a high speed railway UE based on categories of cells that the UE is connected to or camped on in a certain period, and wherein the categories include high speed railway cells and non-high speed railway cells.

11. The apparatus of claim 10, wherein the identifying module is configured to identify the UE as a high speed railway UE if at least one of the following conditions is met:
   past M cells the UE camps on or connects to are all high speed railway cells; and
   past N cells the UE camps on or connects to match a predetermined camping or connecting cell list, wherein M, N are configurable parameters.

12. The apparatus of claim 11, wherein the identifying module is further configured to repeat the identification two or more rounds before making a decision.

13. The apparatus of claim 8, wherein the high speed railway cell has a default neighbor cell list for an UE identified to be a non-high speed railway UE or an UE that is unidentified UE as of whether or not the UE being a high speed railway, and two high speed railway neighbor cell lists for an UE identified to be a high speed railway UE, wherein the default neighbor cell list includes both high speed railway cells and non-high speed railway cells.

14. The apparatus of claim 8, wherein the apparatus is any one of a base station device, a base station control device, and a terminal device.

15. A non-transitory computer readable medium storing a set of computer executable instructions for mobility management in a high speed railway, the instructions comprising:
  identifying whether a User Equipment (UE) is a high speed railway UE that camps on or connects to a high speed railway cell serving the high speed railway;
  if the UE is identified as a high speed railway UE, obtaining a high speed railway neighbor cell list for the UE, wherein the high speed railway neighbor cell list only includes one or more high speed railway cells serving the high speed railway, and wherein each of the one or more high speed railway cells in the high speed railway neighbor cell list is represented by an identifier identifying the cell; and
  triggering at least one of cell reselection and cell handover based on the high speed railway neighbor cell list.

16. The non-transitory computer readable medium of claim 15, wherein the high speed railway cell is a true high speed railway cell covering a high speed section of the high speed railway, wherein the high speed railway in the high speed section operates at a speed higher than 250 kilometer per hour.

17. The non-transitory computer readable medium of claim 15, wherein identifying whether the UE is a high speed railway UE is based on categories of cells that the UE is connected to or camped on in a certain period, and wherein the categories include high speed railway cells and non-high speed railway cells.

18. The non-transitory computer readable medium of claim 15, wherein the UE is identified as a high speed railway UE if at least one of the following conditions is met:
  past M cells the UE camps on or connects to are all high speed railway cells; and
  past N cells the UE camps on or connects to match a predetermined camping or connecting cell list, wherein M, N are configurable parameters.

19. The non-transitory computer readable medium of claim 18, wherein the identifying is repeated two or more rounds before making the decision.

20. The non-transitory computer readable medium of claim 15, wherein the high speed railway cell has a default neighbor cell list for an UE identified to be a non-high speed railway UE or an UE that is unidentified as of whether or not the UE being a high speed railway UE, and two high speed railway neighbor cell lists for an UE identified to be a high speed railway UE, wherein the default neighbor cell list includes both high speed railway cells and non-high speed railway cells.

* * * * *